United States Patent
Detwiler et al.

(10) Patent No.: US 8,767,542 B2
(45) Date of Patent: Jul. 1, 2014

(54) EVENT-BASED SHAPER FOR A PACKET SWITCH

(75) Inventors: Thomas Frederick Detwiler, Huntsville, AL (US); Darrin L. Gieger, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 196 days.

(21) Appl. No.: 13/533,647

(22) Filed: Jun. 26, 2012

(65) Prior Publication Data

US 2013/0343188 A1 Dec. 26, 2013

(51) Int. Cl.
*H04J 1/16* (2006.01)
*H04L 12/28* (2006.01)

(52) U.S. Cl.
USPC .......................... 370/230.1; 370/235; 370/412

(58) Field of Classification Search
None
See application file for complete search history.

(56) References Cited

U.S. PATENT DOCUMENTS

| | | | |
|---|---|---|---|
| 6,704,321 B1 | 3/2004 | Kamiya | |
| 7,525,912 B2 | 4/2009 | Yazaki et al. | |
| 7,724,661 B2 | 5/2010 | Burns | |
| 2003/0152094 A1* | 8/2003 | Colavito et al. | 370/412 |
| 2004/0257995 A1* | 12/2004 | Sandy et al. | 370/235 |
| 2007/0237177 A1* | 10/2007 | Endo et al. | 370/468 |
| 2008/0002717 A1* | 1/2008 | Subrahmanyan et al. | 370/395.51 |
| 2008/0170582 A1* | 7/2008 | Wang et al. | 370/412 |
| 2008/0313486 A1* | 12/2008 | Parfitt | 713/600 |
| 2012/0099606 A1* | 4/2012 | Sato | 370/468 |
| 2013/0077510 A1* | 3/2013 | Nishimura et al. | 370/252 |
| 2013/0343201 A1* | 12/2013 | Desroches | 370/242 |

* cited by examiner

*Primary Examiner* — Andrew Lee
(74) *Attorney, Agent, or Firm* — Smith Risley Tempel Santos LLC; Michael J. Tempel

(57) ABSTRACT

Egress of data packets from a packet switch is controlled in a manner that involves adjusting the shaper accumulators only when a packet egress event or accumulator credit threshold event occurs. A timeline having a number of timeslots is maintained in a memory to mark the times at which events are predicted to occur. If an egress event occurs, in which one or more data packets have been sent from a queue, or if the current timeslot contains a marker, then a count stored in an accumulator is adjusted. If an egress event has occurred or a threshold event in which a count stored in an accumulator has crossed a threshold has occurred, then a marker is stored in a future timeslot.

20 Claims, 4 Drawing Sheets

EVENT-BASED SHAPER FOR A PACKET SWITCH

BACKGROUND

A packet switch is a node in a digital data network that receives data packets from multiple network communication links, temporarily stores and then forwards the data packets onto other links, as directed by the configuration of the packet switch. Upon ingress, packets are classified to belong to a particular data flow that allows packets to egress towards one or more communication links. Storage of packet flows is necessary to ensure proper handling when multiple packets ingress simultaneously, and is typically handled by a plurality of queues. Although packet switches may perform various tasks, a common task is to "shape" each data flow to have a selected egress rate of data packets.

As illustrated in FIG. 1, a conventional packet switch 10 includes a queuing system 11 for storing packets, the egress behavior of which is governed by a scheduler 12 and a shaper 14. Queueing system 11 conveys data packets received at an input port 16 to an output port 18 in the form of a number of logical flows (i.e., streams or flows of data packets addressed to a corresponding number of destinations). Scheduler 12 determines which flow will be the next to egress from queuing system 11. Shaper 14 includes a set of accumulators 20A, 20B, 20C, etc. (which may be referred to collectively as accumulators 20). A controller 22, which may comprise a state machine, controls the operation of shaper 14.

Shaper 14 controls the flow of data packets through packet switch 10 by coordinating with queuing system 11 and scheduler 12. Shaper 14 performs a data flow shaping function in accordance with what is commonly referred to as a form of the "leaky bucket algorithm." The queuing system 11 includes a memory in which queues 24A, 24B, 24C, etc. (which may be referred to collectively as queues 24) are implemented. Each of queues 24 corresponds to one of the data flows. As data packets are received at input port 16, an ingress classifier 25 allocates them to the queues 24 corresponding to the data flows. When one or more queues 24 are not empty, the scheduler 12 must determine which flow within the queuing system 11 shall be the next one selected to egress traffic. Various algorithms for choosing an egress flow are well known and commonly include metrics such as prioritization, fairness, and allocate on the basis of a target egress rate on a per-flow basis. For example, the algorithm may allocate packets with the goal that one data flow has an average egress rate of five megabits per second (Mb/s) while another data flow has an average egress rate of 10 Mb/s.

Each of accumulators 20 in shaper 14 corresponds to one flow (which may in turn correspond to one or more queues 24 or one or more physical ports) and maintains a count or credit balance that increases at the maximum rate at which scheduler 12 requests the flow to egress packet data from the queuing system 11. In some conventional shaper implementations, the accumulators may comprise numerically controlled oscillators or similar counters that increment at a constant rate.

Controller 22 monitors the count or number of credits in each of accumulators 20 by, for example, sequentially polling them. The number of credits in each of accumulators 20 represents the number of bits of data available to send from the corresponding flow while still maintaining the desired egress rate limit. Each time controller 22 polls one of accumulators 20 it determines whether the corresponding flow (i.e., the metaphorical "bucket") has filled with a number of credits to support egress of one or more data packets by determining if the number of credits contained in the corresponding one of accumulators 20 is between a predetermined minimum threshold for sending and predetermined maximum credit level, beyond which additional credit cannot be built up. If the number of credits is within that range, then controller 22 transmits a message to scheduler 12 indicating that scheduler 12 is permitted to transmit one or more data packets on the corresponding data flow. For purposes of clarity, a logical communication path 26 is shown that represents the polling query. Similarly, a logical communication path 28 is shown that represents the results of (or response to) the polling query. Logical communication path 26 can also represent communication of the above-referenced permission. Logical communication paths 26 and 28 are shown in broken line to indicate that they are not direct physical connections; the actual or physical transmission of information representing the polling query and permission message may occur on a connection 30, while the actual or physical transmission of the polling response may occur on a connection 32.

In response to receiving the above-referenced permission message from shaper 14, scheduler 12 may cause queuing system 11 to transmit one or more data packets and then return confirmation information to shaper 14. The confirmation information commonly includes a flow identifier identifying the flow on which the data packet or packets were sent and the number of bits sent. In response to this confirmation information, shaper 14 decrements (by the number of bits sent) the one of accumulators 20 that corresponds to the credit of the flow on which the data packets were sent.

A disadvantage of the above-described conventional shaper 14 is that it is not highly scalable. That is, although the number of data flows out of packet switch 10 can be increased by increasing the number of queues 24 and correspondingly increasing the number of accumulators 20, the duration of sequentially polling accumulators 20 grows proportionally longer. Any given one of accumulators 20 may be polled so infrequently that many queues 24 containing a sufficient number of bits to be eligible to send packets may be excessively delayed from sending packets. Excessive delay in queues 24 sending packets adversely impacts the target egress rates of the flows.

SUMMARY

Embodiments of the invention relate to a method and system for controlling egress of data packets from a packet switch involving adjusting the accumulators only when an event occurs. Events include packet egress events and accumulator credit threshold events. In an exemplary embodiment, the packet switch has a plurality of queues and a plurality of accumulators. The egress behavior of the queues may controlled by, for example, a scheduler system of the packet switch, and the accumulators may be included in, for example, a shaper system of the packet switch. Each accumulator corresponds to one of the queues. Each accumulator and corresponding queue also corresponds to a data flow. Egress of data packets from the queues is controlled in response to the number of credits or counts stored in the accumulators. A timeline is maintained in a memory (i.e. within a data structure). The timeline comprises a finite plurality of sequential timeslots, including a current timeslot and future timeslots.

In accordance with an exemplary method of operation, it is determined whether an egress event has occurred, in which one or more data packets have been sent from a queue. It is also determined whether the current timeslot contains a marker, which marks the time at which an accumulator is to be adjusted. If it is determined that an egress event has occurred or that the current timeslot contains the marker, then a count stored in an accumulator is adjusted. It is further determined if a threshold event has occurred, in which a count stored in an accumulator has crossed a threshold (e.g., a predetermined minimum credit for enabling egress or maximum number of credits that the accumulator can hold). If it is determined that an egress event or a threshold event has occurred, then a marker is stored in the corresponding future timeslot.

In accordance with the exemplary embodiment, a system (which may be referred to as a shaper or shaper system) can include the above-referenced plurality of accumulators and timeline memory structure. In the exemplary embodiment, the system further includes a controller that is programmed or otherwise configured to effect the above-referenced method of operation.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
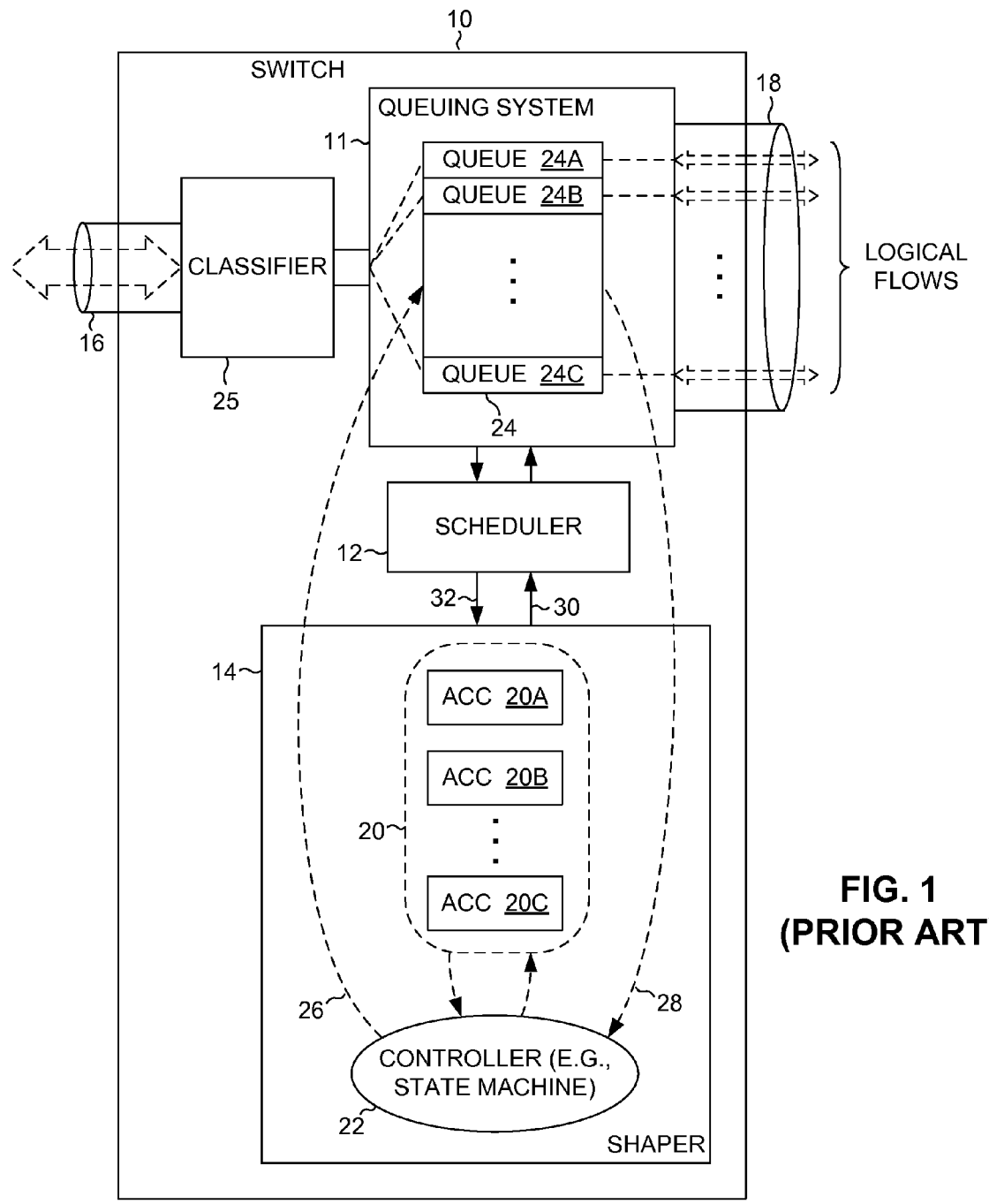
FIG. 1 is a block diagram of a packet switch as known in the prior art.
Figure 2:
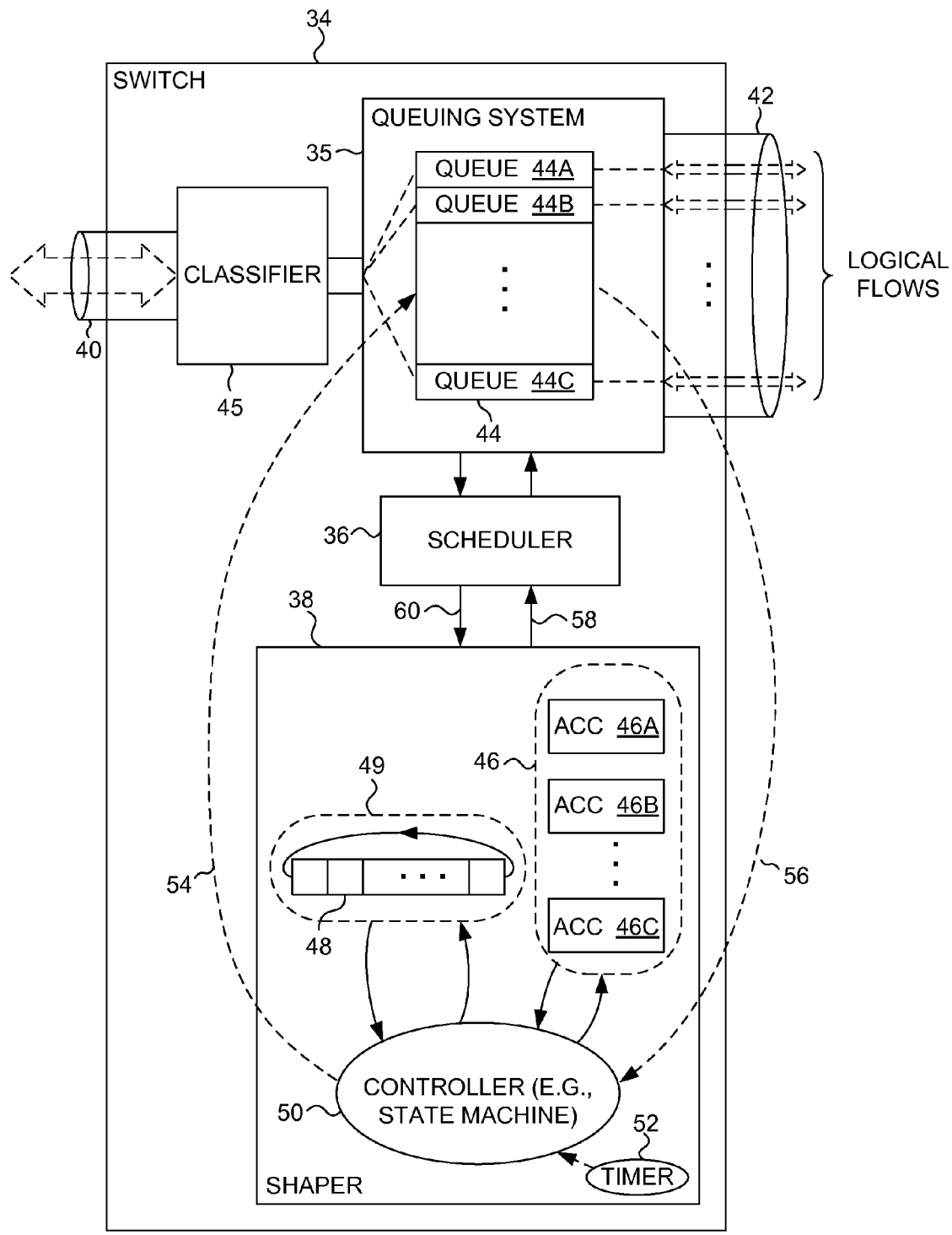
FIG. 2 is a block diagram of a packet switch in accordance with an exemplary embodiment of the invention.

As illustrated in FIG. 2, in an illustrative or exemplary embodiment of the invention, a packet switch 34 includes a queuing system 35, a scheduler 36, and a shaper 38. Queuing system 35 conveys data packets received at an input port 40 to an output port 42 in the form of a plurality of logical flows (i.e., streams or flows of data packets addressed to a corresponding plurality of destinations). Queuing system 35 includes or is associated with a memory in which queues 44A, 44B, 44C, etc. (referred to collectively as queues 44) are implemented. Each data flow corresponds to one or more of queues 44. As data packets are received at input port 40, an ingress classifier 45 allocates the data packets to queues 44 corresponding to the data flows. Once packets among a plurality of flows have been allocated for storage within the queuing system 35, the scheduler 36 is responsible for choosing the flow from which the next packets will egress the queuing system 35. Various algorithms for such selection are well known and commonly include among their criteria a limited target egress rate on a per-flow basis. For example, the algorithm may allocate packets with the goal that one data flow has an average egress rate of five megabits per second (Mb/s) while another data flow has an average egress rate of 10 Mb/s. In the exemplary embodiment, scheduler 36 can perform such allocation in a conventional manner. As such allocation methods and other aspects of the structure and operation of scheduler 36 are well understood by persons skilled in the art, they are not described in further detail herein.

Shaper 38 includes a set of accumulators 46A, 46B, 46C, etc. (which may be referred to collectively as accumulators 46). Shaper 48 further includes a timeline 48 that can comprise a data buffer or data structure in a memory 49. Timeline 48 has a finite plurality (N) of timeslots (representing memory locations) that correspond to a sequence of discrete time intervals. For example, each timeslot may represent some suitable (fractional) number (T) of seconds. The timeslots are sequential in that the first ($1^{st}$) timeslot represents a delta or difference of T from the $0^{th}$ timeslot, the $2^{nd}$ timeslot represents a delta or difference of T from the $1^{st}$ timeslot, etc., through the $(N-1)^{th}$ timeslot. The number (N) of timeslots in timeline 48 is preferably a power of two, such as $2^{16}$. It should be noted that timeline 48 is circular. That is, the $0^{th}$ timeslot within the buffer follows the $(N-1)^{th}$ timeslot in time and represents a delta or difference of T from the $(N-1)^{th}$ timeslot.

A controller 50, which may comprise a finite state machine, controls the operation of shaper 38 in the manner described below. In view of the description below of the method of operation, persons skilled in the art will readily be capable of providing a state machine that effects the method. Memory 49 is shown as a separate element for purposes of clarity in the exemplary embodiment, but in other embodiments such a memory can embody or be shared with accumulators, portions of a controller, or other shaper elements.

A timer 52 is also included in shaper 38 in the exemplary embodiment. Controller 50 can read timer 52 to determine the current time (t) relative to timeline 48. Nevertheless, in other embodiments controller 50 can determine the current time relative to timeline 48 in any other suitable manner. It should be noted that the current time indicated by timer 52 identifies or points to exactly one of the timeslots of timeline 48. As the current time indicated by timer 52 increases, successive timeslots in timeline 48 are identified or pointed to. The identified timeslot thus represents the current time and can be referred to as the current timeslot. All other timeslots represent future times relative to the current timeslot and can be referred to as future timeslots.

As described below in further detail, controller 50 controls the egress of data packets from queues 44 in response to (i.e., based on) the counts or number of credits stored in accumulators 46. The control of the egress of data packets involves communication between shaper 38 and scheduler 36. More specifically, when controller 50 determines that scheduler 36 is to be enabled to transmit or send data packets, controller 50 causes a message to be transmitted to scheduler 36 indicating that scheduler 36 is permitted to transmit one or more data packets on a data flow (i.e., one of queues 44) specified in the message. For purposes of clarity, a logical communication path 54 is shown that represents communication of such a message granting permission to transmit data packets. In response to such a message, scheduler 36 may transmit one or more data packets, depending upon whether sufficient data is stored in the specified flow or queue 44A, 44B, 44C, etc. If scheduler 36 transmits one or more data packets in response to the above-referenced permission message, then scheduler 36 returns a packet egress message to shaper 38. The packet egress message includes information including a flow identifier identifying the flow on which the data packet or packets were sent and the number of bits sent. Another logical communication path 56 is shown that represents communication of such a packet egress message. Logical communication paths 54 and 56 are shown in broken line to indicate that they are not direct physical connections. Rather, the actual or physical transmission of information representing the permission and packet egress messages may occur on connections 58 and 60, respectively, between shaper 38 and scheduler 36.

Figure 3:
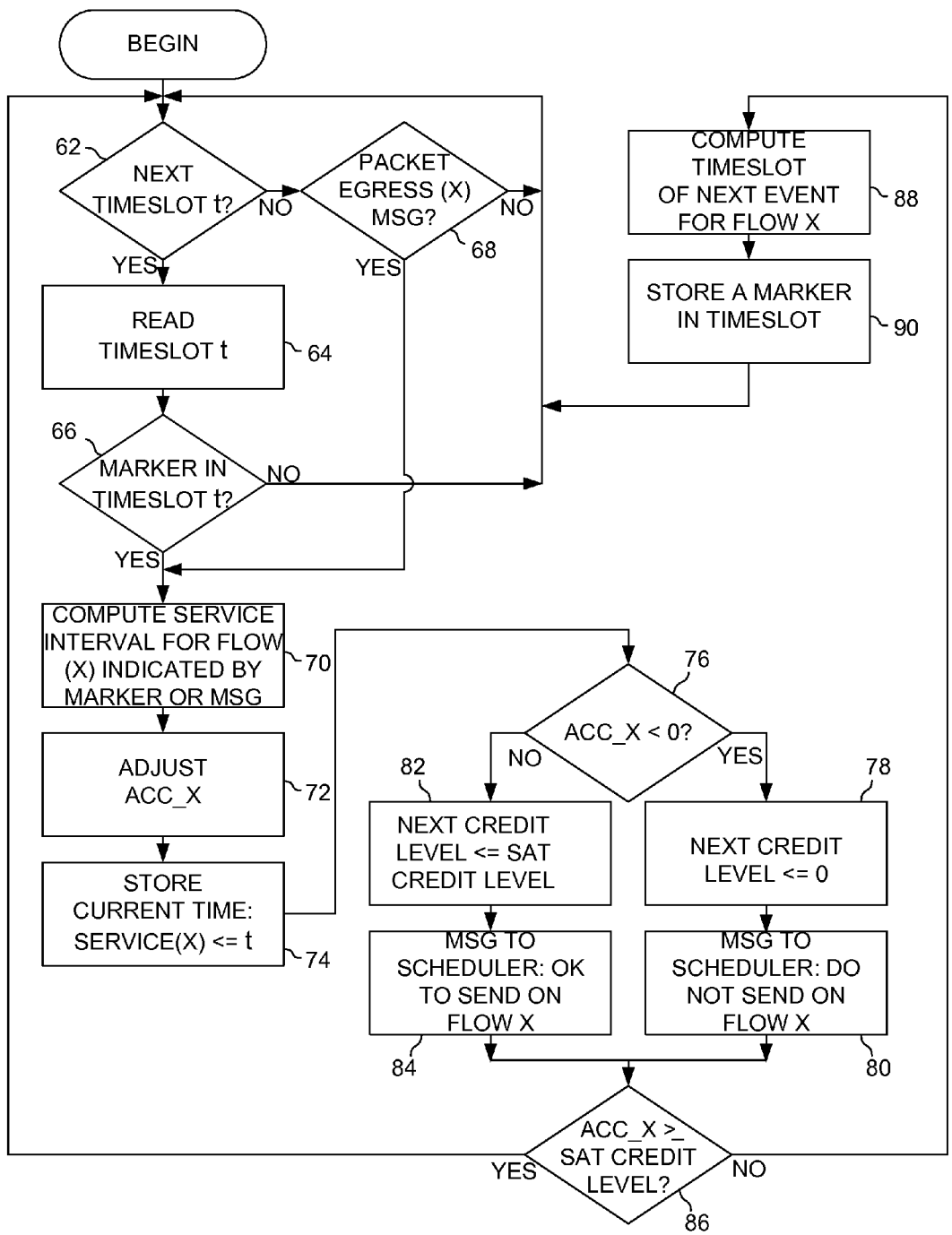
FIG. 3 is a flow diagram illustrating a method of operation of the shaper portion of the packet switch in accordance with the exemplary embodiment of the invention.

An exemplary method of operation of the system of FIG. 2 can be described with respect to the flow diagram of FIG. 3. As indicated by block 62, controller 50 (FIG. 2) obtains the current time from timer 52 and determines whether the current time indicates that the next timeslot (t) has been reached. That is, controller 50 determines whether the current time has advanced by the above-referenced delta (T) since the previous time that controller 50 made the determination indicated by block 62.

If the determination indicated by block 62 indicates that the next timeslot has been reached, then controller 50 reads the contents of that next timeslot, as indicated by block 64. As indicated by block 66, controller 50 determines whether that next timeslot contains a marker (which is described below in further detail). If the determination indicated by block 66 indicates that the next timeslot does not contain a marker, then the method continues from the point indicated by block 62, described above.

If the determination indicated by block 62 indicates that the next timeslot has not been reached, then controller 50 determines whether a packet egress message has been received from scheduler 36, as indicated by block 68. Such a packet egress message indicates that scheduler 36 has sent one or more data packets from queues 44, which can be referred to as a packet egress event. As described above, a packet egress message includes information including a flow identifier identifying the flow (X) on which the data packet or packets were sent and the number of bits sent. If the determination indicated by block 68 indicates that no packet egress message has been received (i.e., no packet egress event has occurred), then the method continues from the point indicated by block 62, described above. Note that controller 50 continues to read successive timeslots as they are reached in time until either a marker is found in one of the timeslots or a packet egress message is received. Although not shown for purposes of clarity, when controller 50 finds a marker controller 50 can remove or erase the marker from the timeslot.

If the determinations indicated by blocks 66 and 68 indicate that either a marker has been found in one of the timeslots or a packet egress message has been received, then controller 50 computes a service interval, as indicated by block 70. The service interval for flow X (where X identifies a flow and is provided by either the marker or the packet egress message) represents the elapsed time or time interval since the time ("SERVICE(X)") that the accumulator corresponding to flow X was most recently adjusted or serviced. Controller 50 can compute the service interval by subtracting the value SERVICE(X) from the current time t (as indicated by timer 52).

As indicated by block 72, when either a marker has been found or a packet egress event has occurred, controller 50 also adjusts or updates the credit count (ACC_X) stored in the one of accumulators 46 that corresponds to flow X by computing the following:

$$ACC\_X \Leftarrow \arg\min[ACC\_X(t-\text{service\_interval}) + \text{bit\_rate\_}X * \text{service\_interval} - \text{number\_of\_bits\_sent}, \text{saturation\_level}]$$

where "arg min" is a function that selects the lesser of the two quantities or arguments, "service interval" is the above-referenced service interval computed in accordance with block 70, "ACC_X(t−service_interval)" is the credit count stored in the accumulator at the time (t−service_interval) previous to this computation, "bit_rate_X" is the predetermined flow rate of flow X, "number_of_bits_sent" is the number of bits indicated by the information in a packet egress message (zero bits if no packet egress message was received), "saturation_level" is a predetermined maximum threshold representing a maximum number of credits or counts (expressed in bits) that the accumulator corresponding to flow X is deemed capable of holding, and the symbol "⇐" represents the updating or replacement of the previous credit count (ACC_X) of that accumulator with the newly computed credit count.

As indicated by block 74, controller 50 also sets (indicated by the symbol "⇐") the value of SERVICE(X) to the current time t to note the time at which the adjusting or servicing of the accumulator corresponding to flow X occurred. This stored value of SERVICE(X) will be used the next time the service interval is computed as described above with regard to block 70.

Following the adjustment of the accumulator corresponding to flow X, additional processing occurs that leads to storing a marker in a future timeslot of timeline 48 (FIG. 2). It should be noted that a marker is stored so long as the above-described determination was made that an egress event or a threshold event has occurred. If the future event is projected to occur more than (N−1) timeslots in the future, it is also possible to store the event in the (N−1) or earlier timeslot, at which time the recomputed accumulator value will not trigger a scheduler event, but will have an opportunity to place a marker at the originally projected timeslot.

As indicated by block 76, controller 50 determines whether the accumulator corresponding to flow X contains a count or number of credits that is less than zero (or, in other embodiments, some other suitable predetermined minimum threshold number). If the determination indicated by block 76 indicates that that accumulator contains a count that is less than zero, then controller 50 sets a "next_credit_level" value to zero, as indicated by block 78, and sends a message that instructs scheduler 36 not to send (or disables scheduler 36 from sending) any more data packets on flow X (i.e., from the queue 44 corresponding to flow X), as indicated by block 80. If the determination indicated by block 76 indicates that that accumulator contains a count that is not less than zero, then controller 50 sets the "next_credit_level" value to the above-referenced saturation level ("saturation_level") or maximum threshold, as indicated by block 82, and sends a message that instructs or enables scheduler 36 to send more data packets on flow X (i.e., from the queue 44 corresponding to flow X), as indicated by block 84.

As indicated by block 86, controller 50 then determines whether a threshold event has occurred in which a count stored in the accumulator corresponding to flow X has crossed a threshold by comparing the count with the saturation level or maximum threshold. If the determination indicated by block 86 indicates that the count stored in the accumulator corresponding to flow X is greater than or equal to the saturation level or maximum threshold, then the method continues from the point indicated by block 62, described above. If the determination indicated by block 86 indicates that the count stored in the accumulator corresponding to flow X is not greater than or equal to the saturation level or maximum threshold, then controller 50 computes or otherwise determines a future timeslot in which to store a marker, as indicated by block 88.

Controller 50 can determine a future timeslot in which to store a marker by computing the following:

$$\text{future\_timeslot} = t + (\text{next\_credit\_level} - ACC\_X)/\text{bit\_rate\_}X$$

As indicated by block 90, controller 50 then stores a marker in this future timeslot in timeline 48 (FIG. 2). If the timeslot is already occupied by a marker, controller 50 can store the marker in a previous or subsequent unoccupied timeslot. In still other embodiments (not shown), a timeslot can accommodate multiple markers. The marker includes information identifying the flow (X) and whether the threshold event (if one occurred) was of the type in which the count has risen above the minimum threshold or of the type in which the count has risen above the maximum threshold or saturation level. The method continues from the point indicated by block 62, described above, with controller 50 reading timeslots as they are reached in time until either a marker is found or a packet egress message is received.

It can be noted that the system and method are efficient because an accumulator corresponding to a flow X is only adjusted in response to the occurrence of one of three events: a packet egress event on flow X (i.e., receipt of a packet egress message); a threshold event in which the count held in the accumulator corresponding to flow X has risen above the minimum threshold; or a threshold event in which the count held in the accumulator corresponding to flow X has risen above the maximum threshold or saturation level. At other times in between the occurrence of such events involving a flow X, the accumulator corresponding to flow X is not adjusted. There is no continuous polling of successive accumulators as in conventional shapers. Thus, the shaper comprises a minimal amount of logic outside the context of the timeslot memory structure and the memory for storing accumulator states.

Figure 4:
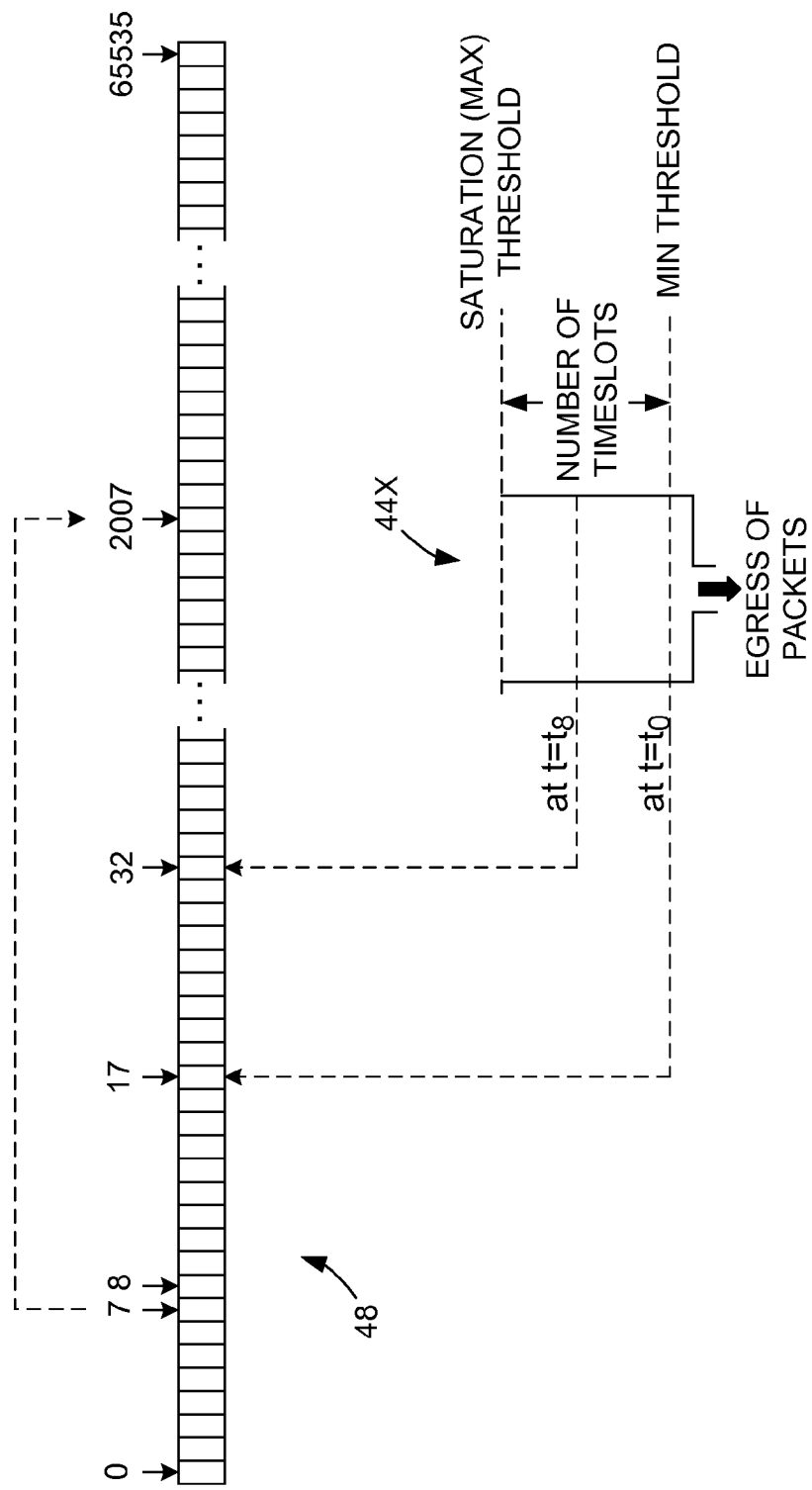
FIG. 4 is a diagram illustrating an exemplary instance of operation of the system of FIG. 2.

An exemplary instance of operation can be described with regard to FIG. 4. In this example, timeline 48 has $2^{16}$ or 65,536 timeslots that can be referred to as timeslot 0 (or $t_0$) through timeslot 65,535 (or $t_{65535}$). When the current time t points to timeslot $t_0$, a first event occurs. The event is one of the three events described above, i.e., either a packet egress event or one of the two types of threshold events. In keeping with the "leaky bucket" metaphor, one of queues 44 (queue 44X in FIG. 4) corresponding to flow X is depicted in a conceptual manner as having bucket-like characteristics. These characteristics include a maximum threshold or saturation level to which queue 44X can be filled and a minimum threshold of some number representing the minimum number of bits that can egress or be sent in the form of a single packet. When the current time t points to timeslot $t_0$ and the event occurs, the accumulator corresponding to flow X has a particular accumulator value, ACC_X. At this time, controller 50 computes the time that the next event is predicted to occur, as described above with regard to block 88 in FIG. 3. As described above, controller 50 first adjusts the accumulator (block 72), based on the presently occurring event, then computes (blocks 76, 78 and 82) the next accumulator credit level ("next_credit_level") predicted to be reached. After computing the time at which the next (threshold) event is predicted to occur, controller 50 stores a marker a future timeslot representing that event. Note that the marker can represent only a threshold event and is not used to represent a packet egress event.

For example, the occurrence of an event at time $t_0$ may cause controller 50 to compute that a maker is to be stored in timeslot $t_{17}$. The marker in timeslot $t_{17}$ indicates to controller 50 at the appropriate time (i.e., when the current time points to timeslot $t_{17}$), that controller 50 must take some action on the event received when the current time pointed to timeslot $t_0$ and that was delayed until the current time pointed to timeslot $t_{17}$. Note that timeslot $t_{17}$ represents a point in time at which a threshold event is predicted or computed to occur. If, for example, the threshold event is that the number of credits or counts stored in the accumulator rises above the minimum threshold, controller 50 will send a message (block 84) that enables packet egress from queue 44X and will store a marker (blocks 88-90) in a future timeslot representing the time at which the accumulator count will reach the maximum threshold or saturation level. If instead, for example, the threshold event is that the number of credits or counts stored in the accumulator rises above the maximum threshold or saturation level, controller 50 may send a message (block 84) that enables packet egress from queue 44X (assuming it is presently in a disabled state) but will not store a marker in a future timeslot.

Continuing with the example, when the current time t points to timeslot $t_8$, controller 50, a second event occurs for the same flow X. In response to the occurrence of this event, controller 50 removes the marker that was stored in timeslot $t_{17}$ and stores a new marker in a future timeslot, such as, for example, timeslot $t_{32}$. In this manner, once a marker is stored in a future timeslot, controller 50 continues searching through successive timeslots of timeline 48 for other markers until either a marker is found or a packet egress event occurs pertaining to flow X.

In summary, when controller 50 is not responding to an egress event, it proceeds through the timeslots of timeline 48 in chronological sequence searching for markers. If controller 50 finds a marker that indicates a threshold event of the type in which the number of credits or counts stored in the accumulator has risen above the minimum threshold, then controller 50 removes the marker from the current timeslot, enables scheduler 36 to send one or more data packets, and also marks the time in timeslot 48 at which a threshold event of the type in which the accumulator count reaches the maximum threshold or saturation level is predicted or computed to occur. If controller 50 finds a marker that indicates a threshold event of the type in which the accumulator count has reached the maximum threshold or saturation level, then controller 50 updates the accumulator credit or count (ACC_X) and removes or erases the marker from the timeslot.

Shaper embodiments readily scale with the overall egress rate of the packet switch because it takes a finite number of clock cycles to process each event. The capacity of shaper 38 in a given embodiment can therefore be based only upon how long it takes to successfully process events in the timeslots, independent of the number of flows being shaped. In a conventional shaper architecture, the maximum per-flow rate is limited by the accumulator update rate (clock frequency divided by the number of accumulators to poll). However, in the system shown in FIG. 2, the number of events is linked to the egress packet rate and not the number of flows.

Shaper 38 is efficient of memory and arithmetic resources because it assigns event reminders in the form of markers to future timeslots using a single state machine to cover all its flows rather than one accumulator state machine per flow. As an example, if the timeslots are 50 ns wide (i.e., the above-referenced value T) in a shaper having eight flows, and a packet sent when the current time points to timeslot t7 is 500 bytes in length and sent at a rate of 40 Mbps, then the packet will be sent at 5 Mbps. The packet length of 500 bytes/5 Mbps takes 100 µs to send, which means that the marker should be placed 100 µs in the future in this example. (Note that 100 µs/50 ns timeslots implies 2000 timeslots in timeline 48.) Therefore, the event that occurs when the current time points to timeslot $t_7$ causes controller 50 to store a marker in timeslot $t_{2007}$.

One or more illustrative or exemplary embodiments of the invention have been described above. However, it is to be understood that the invention is defined by the appended claims and is not limited to the specific embodiments described.

What is claimed is:

1. A method for controlling egress of data packets from a packet switch having a plurality of queues and a plurality of accumulators, each accumulator corresponding to one of the queues, the method comprising:
   controlling egress of data packets from the plurality of queues in response to counts stored in the plurality of accumulators;
   maintaining a timeline in a memory, the timeline comprising a plurality of sequential timeslots including a current timeslot representing a current time and a plurality of future timeslots representing future times;
   determining if an egress event has occurred in which one or more data packets have been sent from a queue;
   determining if the current timeslot contains a marker;
   adjusting a count stored in an accumulator if it is determined that an egress event has occurred or if it is determined that the current timeslot contains the marker;
   determining if a threshold event has occurred in which a count stored in an accumulator has crossed a threshold; and
   storing a marker in a future timeslot if it is determined that an egress event or a threshold event has occurred.

2. The method of claim 1, wherein adjusting a count stored in an accumulator comprises adjusting an accumulator corresponding to the queue if it is determined that an egress event has occurred and adjusting an accumulator identified by the marker if it is determined that the current timeslot contains the marker.

3. The method of claim 2, wherein adjusting an accumulator comprises:
   determining a shaper credit quantity in response to a bit rate and a time interval between the current time and a previous adjustment of the accumulator; and
   determining an egress data quantity from the shaper credit quantity representing data packets sent from the queue during the time interval;
   increasing the count stored in the accumulator by the shaper credit quantity; and
   decreasing the count stored in the accumulator by the egress data quantity.

4. The method of claim 3, wherein adjusting an accumulator further comprises limiting the count stored in the accumulator to a predetermined saturation level.

5. The method of claim 1, wherein determining if a threshold event has occurred comprises:
   determining if the count stored in the accumulator is less than a predetermined minimum; and
   determining if the count stored in the accumulator is greater than or equal to a predetermined maximum.

6. The method of claim 5, wherein storing a marker in a future timeslot comprises storing a marker identifying the accumulator in the future timeslot.

7. The method of claim 5, wherein storing a marker in a future timeslot comprises determining the future timeslot in response to the count stored in the accumulator, a next threshold, and a bit rate.

8. The method of claim 7, wherein determining the future timeslot comprises dividing a difference between the next threshold and the count stored in the accumulator by the bit rate.

9. The method of claim 7, further comprising:
   setting the next threshold to the predetermined minimum if it is determined that the count stored in the accumulator is less than the predetermined minimum; and
   setting the next threshold to the predetermined maximum if it is determined that the count stored in the accumulator is not less than the predetermined minimum.

10. The method of claim 9, wherein controlling egress of data packets from the plurality of queues comprises:
    disabling egress of data packets from the queue corresponding to the accumulator if it is determined that the count stored in the accumulator is less than the predetermined minimum; and
    enabling egress of data packets from the queue corresponding to the accumulator if it is determined that the count stored in the accumulator is not less than the predetermined minimum.

11. A system for controlling egress of data packets from a packet switch having a plurality of queues, the system comprising:
    a plurality of accumulators, each accumulator corresponding to one of the queues;
    a timeline memory structure, the timeline memory structure comprising a plurality of sequential timeslots including a current timeslot representing a current time and a plurality of future timeslots representing future times; and
    a controller programmed or configured to:
       control egress of data packets from the plurality of queues in response to counts stored in the plurality of accumulators;
       determine if an egress event has occurred in which one or more data packets have been sent from a queue;
       determine if the current timeslot contains a marker;
       adjust a count stored in an accumulator if it is determined that an egress event has occurred or if it is determined that the current timeslot contains the marker;
       determine if a threshold event has occurred in which a count stored in an accumulator has crossed a threshold; and
       store a marker in a future timeslot if it is determined that an egress event or a threshold event has occurred.

12. The system of claim 11, wherein the controller is programmed or configured to adjust a count stored in an accumulator by being programmed or configured to adjust an accumulator corresponding to the queue if it is determined that an egress event has occurred and adjust an accumulator identified by the marker if it is determined that the current timeslot contains the marker.

13. The system of claim 12, wherein the controller is programmed or configured to adjust an accumulator by being programmed or configured to:
    determine a shaper credit quantity in response to a bit rate and a time interval between the current time and a previous adjustment of the accumulator; and
    determine an egress data quantity from the ingress data quantity representing data packets sent from the queue during the time interval;
    increase the count stored in the accumulator by the shaper credit quantity; and
    decrease the count stored in the accumulator by the egress data quantity.

14. The system of claim 13, wherein the controller is programmed or configured to adjust an accumulator by further being programmed or configured to limit the count stored in the accumulator to a predetermined saturation level.

15. The system of claim 11, wherein the controller is programmed or configured to determine if a threshold event has occurred by being programmed or configured to:
- determine if the count stored in the accumulator is less than a predetermined minimum; and
- determine if the count stored in the accumulator is greater than or equal to a predetermined maximum.

16. The system of claim 15, wherein the controller is programmed or configured to store a marker in a future timeslot by being programmed or configured to store a marker identifying the accumulator in the future timeslot.

17. The system of claim 15, wherein the controller is programmed or configured to store a marker in a future timeslot by being programmed or configured to determine the future timeslot in response to the count stored in the accumulator, a next threshold, and a bit rate.

18. The system of claim 17, wherein the controller is programmed or configured to determine the future timeslot by being programmed or configured to divide a difference between the next threshold and the count stored in the accumulator by the bit rate.

19. The system of claim 17, wherein the controller is further programmed or configured to:
- set the next threshold to the predetermined minimum if it is determined that the count stored in the accumulator is less than the predetermined minimum; and
- set the next threshold to the predetermined maximum if it is determined that the count stored in the accumulator is not less than the predetermined minimum.

20. The system of claim 19, wherein the controller is programmed or configured to control egress of data packets from the plurality of queues by being programmed or configured to:
- disable egress of data packets from the queue corresponding to the accumulator if it is determined that the count stored in the accumulator is less than the predetermined minimum; and
- enable egress of data packets from the queue corresponding to the accumulator if it is determined that the count stored in the accumulator is not less than the predetermined minimum.

* * * * *